United States Patent
Kaiser

[15] 3,704,720
[45] Dec. 5, 1972

[54] FLUIDIC DEICER VALVE
[72] Inventor: Frederick A. Kaiser, Clinton, N.Y.
[73] Assignee: The Bendix Corporation, Southfield, Mich.
[22] Filed: Dec. 28, 1970
[21] Appl. No.: 101,886

[52] U.S. Cl. ................................137/81.5, 244/134
[51] Int. Cl. ..........................F15c 1/12, B64d 15/04
[58] Field of Search..........137/81.5; 244/134, 134 A

[56] References Cited

UNITED STATES PATENTS

| | | | |
|---|---|---|---|
| 3,494,357 | 2/1970 | Kimball | 137/81.5 X |
| 3,263,702 | 8/1966 | Pullen et al. | 244/134 X |
| 3,452,665 | 7/1969 | Furlong | 137/81.5 X |
| 2,753,138 | 7/1956 | MacIntyre | 244/134 A |
| 3,565,564 | 2/1971 | Paulin et al. | 137/81.5 X |
| 3,598,116 | 8/1971 | Peters | 137/81.5 X |

Primary Examiner—William R. Cline
Attorney—Bruce A. Yungman and Plante, Hartz, Smith & Thompson

[57] ABSTRACT

A pneumatically controlled deicer valve is provided for inflating the distensible elements adapted to prevent the accumulation of ice upon wings and other air-foils and surfaces of aircraft. Unregulated engine bleed air is supplied directly to the valve and on command of a timer fed directly into the deicing boot. A fluidic circuit in the valve causes the boot to be evacuated immediately after the boot has attained a predetermined value of pressure. An ejector which is part of the valve further reduces the pressure in the deicing boot until it is below ambient.

4 Claims, 8 Drawing Figures

FREDERICK A. KAISER
INVENTOR.

TRUTH TABLE

| FIGURE | INPUTS | | OUTPUTS | |
|---|---|---|---|---|
| | $S_e$ | $S_p$ | $O_a$ | $O_b$ |
| 4 | 0 | 0 | 0 | 1 |
| 5 | 1 | 0 | 1 | 0 |
| 6 | 1 | 1 | 0 | 0 |
| 7 | 1 | 0 | 0 | 1 |
| RESET | 0 | 0 | 0 | 1 |

FREDERICK A. KAISER
INVENTOR.

BY

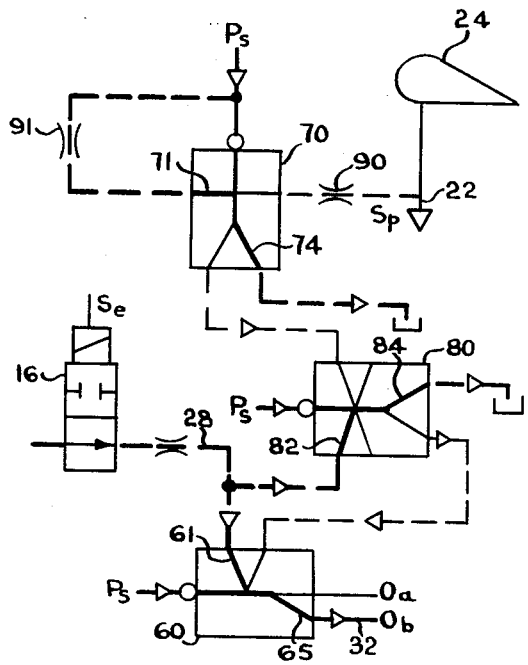
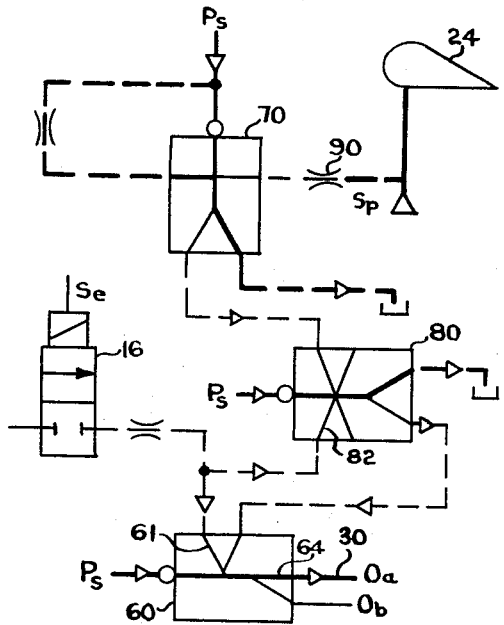
FIGURE 4
FIGURE 5
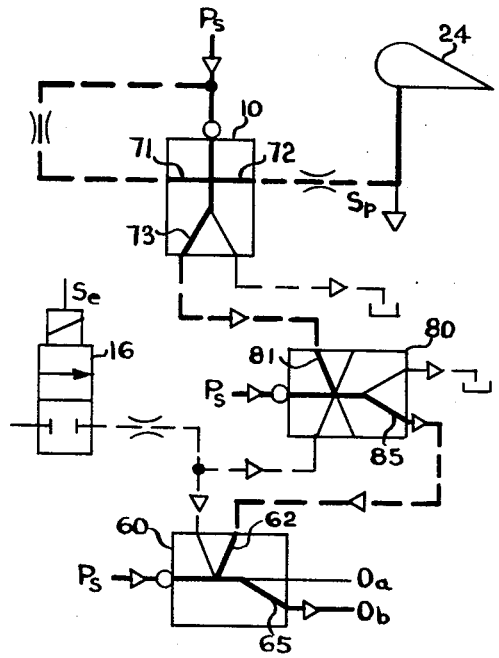
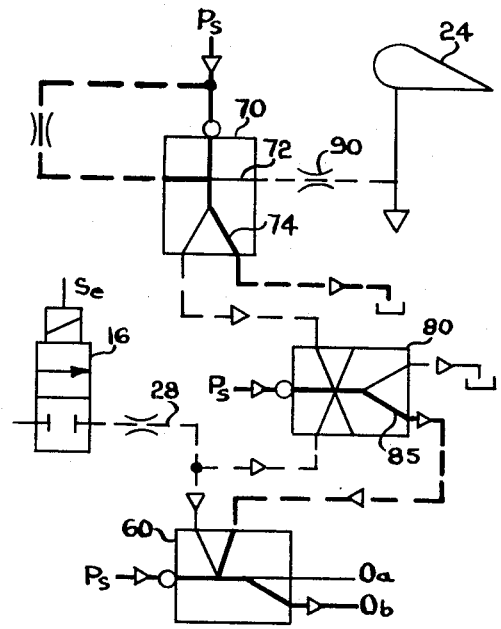
FIGURE 6
FIGURE 7
FREDERICK A. KAISER
INVENTOR.

FLUIDIC DEICER VALVE

FIELD OF THE INVENTION

The invention relates to apparatus for inflating distensible units and especially to apparatus for inflating inflatable units or elements adapted to prevent the accumulation of ice upon wings and other airfoils and surfaces of aircraft.

BACKGROUND OF THE INVENTION

Prior constructions have employed a plurality of inflatable boots mounted on the wings and other aircraft surfaces and inflated in alternation for ice removal and other purposes. This has generally resulted in complicated pressure in exhaust piping systems between the boots or units, individual control valves at such units and other operating and timing gear therefor which have been somewhat complex and heavy, thereby adding weight to the aircraft and occupying precious space. Such systems were frequently provided with a central or system regulating valve. For these and other reasons, such for example, as the high cost of the equipment, the prior constructions have not been entirely satisfactory for the intended purpose.

An object of the invention is to provide means for overcoming these and other disadvantages of the prior constructions.

SUMMARY OF THE INVENTION

The deicer valve consists of five major components. A regulator supplies the driving air for an ejector and also provides pressurized air to the fluidic circuit. A two-positioned, three-connection balanced valve permits bleed air to enter the boot or air trapped in the boot to exhaust to an ejector. An ejector is provided to reduce the boot pressure below ambient when required. A normally open pneumatic solenoid valve provides the control air for the fluidic circuit. A fluidic circuit is included for controlling the operative position of the balanced valve. The inflation and deflation of the boot is ultimately controlled by a timing mechanism which is not part of this invention.

The use of the disclosed deicer valve in a deicing system eliminates the need for a central or system regulating valve. Another object of this invention is to utilize unregulated engine bleed air as the source of air for the valve. Further, the regulator which supplies the driving air for the ejector and also provides the control air for the fluidic circuit is approximately 10 percent of the size of the regulator for which this valve is replacing, since less regulated air is required.

By locating the deicer valve immediately before the deicer boot, bleed air at its higher pressure hence lower specific volume can be piped through the aircraft. This makes a higher source of energy available for boot inflation resulting in a sharp inflation in the deicing boot thereby facilitating ice removal. The lower specific volume of the bleed air can also permit the use of smaller line sizes resulting in a system weight savings.

It is a further object of this invention to provide a deicer valve having fewer moving parts with a resultant increase in reliability by using a fluidic circuit to control the valve's operation.

It is a still further object of this invention to provide a deicer valve operatively controlled by a fluidic circuit thus having the ability to operate safely in a hazardous environment without causing fires or explosions, and tolerance of extremes of environment such as shock, vibration, temperature and corrosive environment.

Another object is to provide a fluidic controlled deicer valve of low cost and of such simplicity that it facilitates low cost maintenance.

BRIEF DESCRIPTION OF THE DRAWINGS

FIG. 4 is a schematic representation of fluid flow (in the fluidic circuitry of FIG. 2) during the steady state condition.

FIG. 5 is a schematic representation of fluid flow (in the fluidic circuitry of FIG. 2) upon energization of the timing mechanism by the pilot.

FIG. 6 is a schematic representation of fluid flow (in the fluidic circuitry of FIG. 2) after the boot has reached its predetermined maximum inflation pressure.

FIG. 7 is a schematic representation of fluid flow (in the fluidic circuitry of FIG. 2) after the boot has been deflated but before the timing mechanism has been de-energized.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
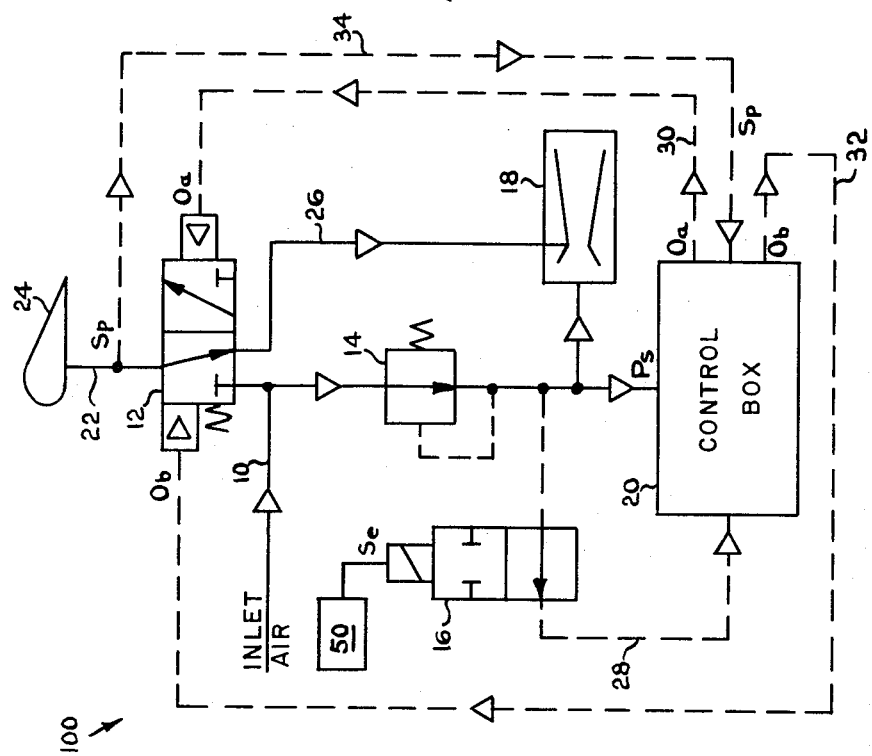
FIG. 1 is a schematic representation of the preferred embodiment of a deicer valve in accordance with this invention.

Referring now to FIG. 1, the first form of the invention, generally designated by reference numeral 100 will be described. As is there shown, fluid is conveyed through passage 10 to the two-position, three-connection valve 12, to the regulator 14, to the normally opened pneumatic solenoid 16, to the ejector 18, and to the control box 20. Passage 22 interconnects the two-position, three-connection valve 12 with an enclosure such as an aircraft deicing boot 24. Passage 26 connects valve 12 with ejector 18. A control signal from solenoid 16 is conveyed to control box 20 by means of passage 28. The two outputs from control box 20, $O_a$ and $O_b$ are conveyed to valve 12 by means of passages 30 and 32 respectively. Passage 34 provides a means for a further control signal to be carried to control box 20 whenever the pressure within enclosure 24 reaches a predetermined magnitude.

In a steady state condition, valve 12 connects passage 22 with passage 26 thereby maintaining enclosure 24 in an evacuated state. Note that ejector 18 is always supplied with regulated bleed air from passage 10.

Also, as above mentioned, regulated fluid is normally supplied to control box 20 through passage 28 since solenoid 16 is normally opened. Valve 12 is maintained in its steady state position by output signal $O_b$ generated by control box 20. The energization of solenoid 16 is controlled by a timer 50 which is not part of this invention; of course, any equivalent actuating means for energizing the solenoid could also be used whether automatically or manually controlled. The activation of the timer 50 is controlled by the pilot of the aircraft.

Figure 8:
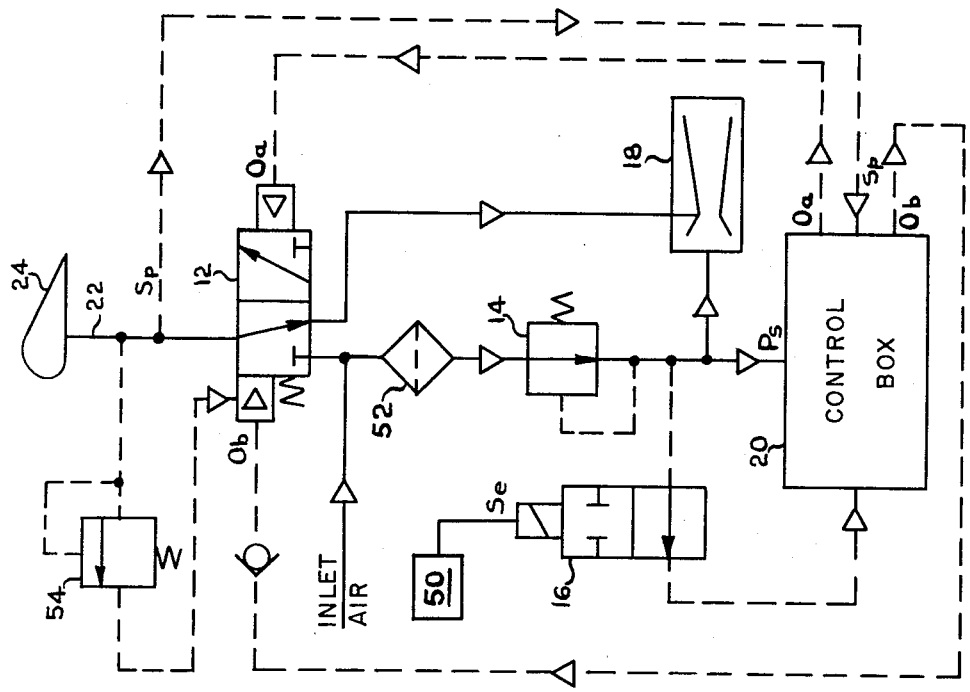
FIG. 8 is a schematic representation of an alternative embodiment of a deicer valve in accordance with this invention.

An alternative embodiment of this invention is shown in FIG. 8 which embodiment is essentially the same as described above with two exceptions. These exceptions are the addition of a filter 52 in passage 10 prior to regulator 14, and the addition of a safety valve 54 in passage 22. The purpose for adding these two additional elements will be discussed infra.

Figures 2, 3:
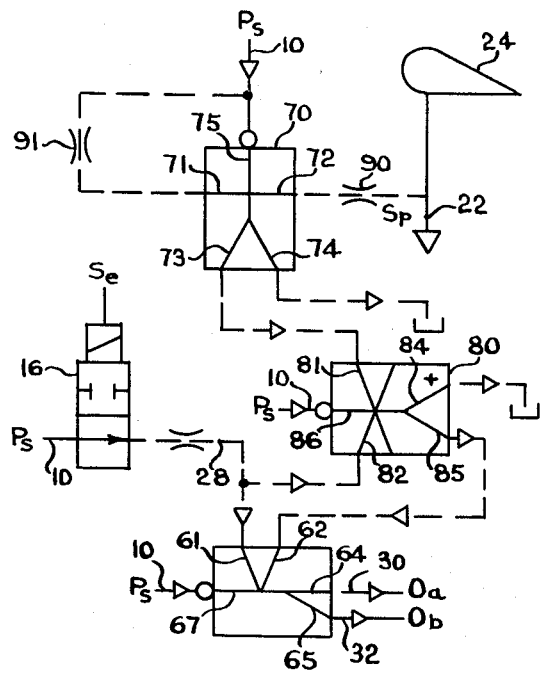
FIG. 2 is a schematic depiction of the fluidic circuitry in accordance with the control box shown in FIG. 1.
FIG. 3 is a truth table of the fluidic logic for the various control states.

Control box 20 consists of three fluidic devices 60, 70 and 80 shown schematically in FIG. 2. The input ducts of all three devices (or gates) are supplied with regulated bleed air, noted as $P_s$, from passage 10. Gate 60 has two control ducts 61 and 62. Fluid is supplied to control duct 61 by means of passage 28. Fluid is supplied to control duct 62 from output duct 85 of gate 80. Gate 60 has two output ducts 64 and 65 from which the signals $O_a$ and $O_b$ are generated. Fluidic gate 60 is monostable in nature of the boundary layer-lock-on type sometimes referred to as an or-nor gate. The device is constructed so that flow of fluid through the passage 10 to the passage 30 will flow through the input duct 67 and the stable output duct 64. However, the flow of fluid will be switched from the stable output duct 64 to the unstable output duct 65 if fluid under pressure is introduced through the control ducts 61 and/or 62.

Fluidic device 70 is bistable in nature of the boundary layer-lock-on type sometimes referred to as a flip-flop gate. This device also has two control ducts 71 and 72, and two output ducts 73 and 74. This device has a memory in that the introduction of a control signal effects an output that will remain even after the control signal is turned off. That is, fluid that enters from passage 10 through input duct 75 can be directed to either output duct 73 or 74 depending on whether or not a control signal has been introduced at duct 72 or duct 71 respectively. However, this particular gate is designed such that a reference pressure exists across the gate via ducts 71 and 72, so that an output at duct 73 can only be effected when the pressure at restrictor 90 exceeds the reference pressure at control duct 71; in the absence of this condition occuring, output will always be at control duct 74. Output flow through output duct 74 is dumped to atmosphere, whereas the output from duct 73 provides the fluid for control duct 81 of fluidic gate 80. The reference pressure is established at control duct 71 by means of a restrictor 91 positioned between passage 10 and the control duct 71. Restrictor 90, on the other hand, is located in passage 34 which interconnects passage 22 with control duct 72.

Fluidic device 80 is also bistable with preference, i.e., the system will start with flow out of duct 84. This gate has an input duct 86, two control ducts 81 and 82, and two output ducts 84 and 85. Regulated bleed air is supplied to input duct 86 by means of passage 10. Output at duct 84 is effected by the presence of a control signal at control duct 82; control fluid for this purpose is conveyed to duct 82 by passage 28. An output at 85 is effected by the presence of a control signal at control duct 81; the control fluid for this purpose is the output from output duct 73 of gate 70 under the conditions mentioned above. Output at output duct 84 is dumped to atmosphere, whereas output at duct 85 is a control signal for control duct 62 of gate 60.

Referring to FIGS. 3 and 4, the operative status of the deicer valve during the steady state condition can be determined. The pilot has not activated the timing mechanism and, therefore, there is no presence of an electrical signal $S_e$ at solenoid 16. Thus, fluid is permitted to enter control duct 61 of fluidic gate 60; the presence of a control signal at control duct 61 causes an output at output duct 65 denoted as $O_b$. This fluid output is transferred to the two-position balanced valve 12 by means of passage 32. The presence of signal $O_b$ at balance valve 12 connects passage 22 with passage 26, this being the phase of operation in which the enclosure 24 is voided of fluid due to the suction created by ejector 18. Passage 28 also carries the fluid signal from solenoid 16 to control duct 82 of fluidic gate 80. The presence of a control signal at control duct 82 causes an output at output duct 84. As shown in the drawing, a reference pressure is established at control duct 71 of fluidic gate 70 by means of the restrictor 91. This pressure at control duct 71 produces an output at output duct 74. In all stages of operation, the fluidic gates 60, 70 and 80, the ejector 18 and the solenoid 16 are supplied with regulated air from passage 10 since the bleed air must pass through the regulator 14.

Referring now to FIGS. 3 and 5, it can be seen that the timing mechanism has been energized by the pilot thereby causing solenoid 16 to cut off fluid flow to the fluidic circuitry. With a control signal no longer present at control duct 61 of fluidic gate 60, the output is now switched to output duct 64 thus producing output $O_a$ in passage 30. Output $O_a$ is carried by passage 30 to the two-position valve 12 causing the valve 12 to switch to its second position. In this position, unregulated engine bleed air is supplied directly to enclosure 24 by means of passage 22, and the ejector 18 is operatively disconnected. By locating the deicer valve 100 immediately before the deicer boot 24, bleed air at its higher pressure (hence lower specific volume) can be piped through the aircraft. This makes a higher source of energy available for boot inflation resulting in a sharp inflation of the deicing boot thereby facilitating ice removal. Note that in this stage of operation, the status of fluidic gate 70 has not been changed, and the output from fluidic gate 80 has not been changed, although the control signal at control duct 82 has been eliminated.

Referring to FIGS. 3 and 6, the fluid flow in the fluidic circuitry is shown when the boot 24 has reached its predetermined maximum inflation pressure as determined by the restrictor 90 in passage 22. Since this pressure exceeds the referenced pressure in control duct 71 of gate 70, the output of gate 70 is switched to output duct 73. The output from output duct 73 in turn is the input for control duct 81 of fluidic gate 80. The presence of a control signal in control duct 81 of gate 80 causes the output of gate 80 to be switched to output duct 85. The output at output duct 85 is the control signal for the control duct 62 of fluidic gate 60. The presence of a control signal in control duct 62 of gate 60 produces an output at output duct 65. The output at output duct 65 is again $O_b$, which output signal is carried by passage 32 back to the two-position three-connection valve 12, thereby switching valve 12 to its steady state condition described in reference to FIG. 4 above. Valve 12 again connects passage 22 with passage 26, allowing ejector 18 to withdraw the fluid in boot 24 until the pressure in the boot is below ambient. The pneumatic signal $S_p$ determined by restrictor 90 is carried to control duct 72 of gate 70 by passage 34.

Referring now to FIGS. 3 and 7, the schematic representation of fluid flow after the boot has been deflated but before the timing mechanism has been de-energized is shown. That is, the pressure at restrictor 90 has dropped below its predetermined maximum magnitude. This eliminates the control signal at control duct 72 of fluidic gate 70 which in turn causes the output to be switched to output duct 74 as in FIG. 4 above. The output of gate 80 remains at output duct 85 as in FIG. 5. This latter condition maintains the output $O_b$ from gate 60 until the solenoid valve 16 opens at the end of the energized portion of the timer cycle. When the timer cycle does end, the electrical signal $S_e$ in solenoid 16 is eliminated thereby causing fluid to once again enter passage 28 as shown in FIG. 4 and the control has been reset for another cycle on command of the timer.

Referring to FIG. 8, an alternative embodiment of the present invention is shown as was mentioned supra. This embodiment is essentially the same as the preferred embodiment, however, two additional elements have been added. These elements are the filter 52 and the safety valve 54. Because of the small passage sizes in the fluidic gates, it may be desirable to include a filter 52 in the fluid line supplying the regulator 14. Further, to increase reliability, a safety valve 54 can be added to the invention. The safety valve 54 senses pressure in the deicing boot 24 and permits the flow of fluid to valve 12 should the pressure in enclosure 24 exceed a predetermined value. The need for this valve would arise whenever valve 12 failed to change its position as a result of the force developed by pressure $O_b$. In this case, the pressure in enclosure 24, which is much higher than $O_b$, is fed directly to valve 12 to develop a much higher force so that valve 12 moves to its proper position. Enclosure 24 is then exposed to passage 26 which exhausts the enclosure 24. Safety valve 54 reseats and the system is returned to its normal mode of operation.

It is to be understood that there are many types of valves in the art that would meet the requirements of the two-position three-connection balance valve 12. Also, there are many mechanical equivalents for the venturi type ejector 18. The spring biased regulator valve 14 is approximately 10 percent of the size of the regulator which this valve is replacing. Further, it should be remembered that although this invention is used in a deicing system for aircraft wherein the need for a central or system regulating valve has been eliminated, the valve could be used in any system requiring the filling and emptying of an enclosure intermittently with a fluid responsive to an external timing means.

Having described the invention, what is claimed is:

1. An apparatus for filing and emptying an enclosure intermittently with a fluid responsive to an external actuating means including a first phase wherein said enclosure is voided of fluid and a second phase wherein said enclosure is filled with fluid comprising:
   a source of fluid under pressure;
   valve means operatively connected to said enclosure and said fluid source for controlling fluid intake to or exhaust from said enclosure;
   first fluidic means which receives supply fluid from said fluid source and which, in response to said external actuating means, operatively connects said valve means to said enclosure for said second phase condition;
   second fluidic means having a fluid supply passage for receiving fluid from said fluid source; control passage means responsive to the fluid pressure in said enclosure; and a plurality of output passages operatively connecting said enclosure with said first fluidic means such that a first output is exhausted to atmosphere, and a second output provides a fluid signal when the pressure in said enclosure reaches a pre-established magnitude; and
   third fluidic means having a fluid supply passage for receiving fluid from said fluid source; a plurality of control passages responsive to said actuating means and responsive to said fluid signal generated by said second fluidic means; and a plurality of output passages operatively connected to said first fluidic means such that a first output is exhausted to atmosphere, and a second output provides a fluid signal to said first fluidic means thereby connecting the valve means with the enclosure for said first phase condition.

2. An apparatus for filling and emptying an enclosure intermittently with fluid responsive to external actuating means including a first phase wherein said enclosure is voided of fluid and a second phase wherein said enclosure is filled with fluid comprising:
   a source of fluid under pressure;
   evacuation means operatively connected to said fluid source and said enclosure for voiding the enclosure of fluid;
   valve means operatively interconnecting said enclosure, said fluid source and said evacuation means for controlling fluid intake to and exhaust from said enclosure; and
   a fluidic device having a fluid supply passage for receiving fluid from said fluid source, at least one control passage responsive to said actuating means and to the fluid pressure in said enclosure, and a plurality of output passages operatively connected to said valve means such that a first output connects the valve means with the enclosure for said first phase condition and a second output connects the valve means with the enclosure for said second phase condition.

3. An apparatus for filling and emptying an enclosure intermittently with fluid responsive to external actuating means including a first phase wherein said enclosure is voided of fluid and a second phase wherein said enclosure is filled with fluid comprising:
   a source of fluid under pressure;
   evacuation means operatively connected to said fluid source and said enclosure for voiding the enclosure of fluid;

valve means operatively interconnecting said enclosure, said fluid source and said evacuation means for controlling fluid intake to and exhaust from said enclosure; and first fluidic means which receives supply fluid from said fluid source and which in response to a pressure of predetermined magnitude in said enclosure operatively connects said valve means to said enclosure for said first phase condition; and second fluidic means which receives supply fluid from said fluid source and which in response to said external actuating means operatively connects said valve means to said enclosure for said second phase condition.

4. An apparatus for filling and emptying an enclosure intermittently with fluid responsive to external actuating means including a first phase wherein said enclosure is voided of fluid and a second phase wherein said enclosure is filled with fluid comprising:

a source of fluid under pressure;

evacuation means operatively connected to said fluid source and said enclosure for voiding the enclosure of fluid;

valve means operatively interconnecting said enclosure, said fluid source and said evacuation means for controlling fluid intake to and exhaust from said enclosure; and fluidic means which receives supply fluid from said fluid source and which in response to a pressure of predetermined magnitude in said enclosure operatively connects said valve means to said enclosure for said first phase condition.

* * * * *